United States Patent
Daultani et al.

(10) Patent No.: US 12,462,546 B2
(45) Date of Patent: Nov. 4, 2025

(54) INFORMATION PROCESSING APPARATUS, INFORMATION PROCESSING METHOD, NON-TRANSITORY COMPUTER READABLE MEDIUM, AND LEARNING MODEL

(71) Applicant: Rakuten Group, Inc., Tokyo (JP)

(72) Inventors: Dinesh Daultani, Tokyo (JP); Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/009,267

(22) PCT Filed: Dec. 7, 2021

(86) PCT No.: PCT/JP2021/044857
§ 371 (c)(1),
(2) Date: Dec. 8, 2022

(87) PCT Pub. No.: WO2023/105609
PCT Pub. Date: Jun. 15, 2023

(65) Prior Publication Data
US 2024/0233353 A1 Jul. 11, 2024

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01)

(58) Field of Classification Search
CPC ............. G06V 10/454; G06V 10/7625; G06V 10/764; G06V 10/7715; G06V 10/774; G06V 10/82
See application file for complete search history.

(56) References Cited

U.S. PATENT DOCUMENTS

| 2021/0406615 A1 | 12/2021 | Rao et al. |
| 2023/0025450 A1* | 1/2023 | De La Comble ...... G06N 3/082 |

(Continued)

FOREIGN PATENT DOCUMENTS

| JP | 2019-164402 A | 9/2019 |
| JP | 6612487 B1 | 11/2019 |

OTHER PUBLICATIONS

Xinqi Zhu et al., "B-CNN: Branch Convolutional Neural Network for Hierarchical Classification", arXiv:1709.09890v2 [cs.CV], Oct. 5, 2017, (9 pages).

(Continued)

*Primary Examiner* — Manuchehr Rahmjoo
(74) *Attorney, Agent, or Firm* — Sughrue Mion, PLLC (57) ABSTRACT

An information processing apparatus includes an acquiring unit configured to acquire an object image that includes an object, and a predicting unit configured to predict a class of the object by applying the object image acquired by the acquiring unit to a learning model. The learning model includes a main network (201) that extracts feature amounts regarding hierarchical classes of the object based on the object image, and a sub network (202) that outputs hierarchical classes of the object based on the feature amounts. The main network (201) includes extractors that extract the feature amounts. The sub network (202) includes classifiers that output classes of the object based on the feature amounts, and in the sub network, a higher-level classifier has a connection to one or more lower-level classifiers.

12 Claims, 9 Drawing Sheets

(56) References Cited

U.S. PATENT DOCUMENTS

2023/0222821 A1* 7/2023 Delp, III ............... G06V 10/44
                                                                382/110
2023/0258610 A1* 8/2023 Takemoto .......... G01N 29/4409
                                                                73/606
2023/0394791 A1* 12/2023 Wang ................... G06V 10/764

OTHER PUBLICATIONS

Yian Seo, et al. "Hierarchical Convolutional Neural Networks for Fashion Image Classification", Expert Systems With Applications (2018), 27 pages, https://doi.org/10.1016/j.eswa.2018.09.022.
Kolisnik, B., et al., "Condition-CNN: A hierarchical multi-label fashion image classification model", Expert Systems With Applications, vol. 182, No. 115195, 2021, 14 pages.

* cited by examiner

| TRAINING DATA SET | TRAINING DATA ELEMENT (LABEL) | | | | | | | | | |
|---|---|---|---|---|---|---|---|---|---|---|
| 1 |  | 1 | 2 |  | 4 |  | 6 |  | 8 | 9 |
| 2 |  | 1 | 2 | 3 | 4 |  | 6 | 7 | 8 | 9 |
| 3 |  | 1 | 2 | 3 | 4 |  | 6 | 7 |  | 9 |
| 4 | 0 | 1 | 2 | 3 | 4 |  | 6 | 7 | 8 | 9 |
| 5 | 0 | 1 |  | 3 | 4 |  | 6 | 7 | 8 | 9 |
| 6 | 0 | 1 | 2 | 3 | 4 | 5 | 6 | 7 | 8 | 9 |
| 7 | 0 | 1 | 2 | 3 | 4 | 5 |  | 7 | 8 | 9 |
| 8 | 0 | 1 | 2 | 3 | 4 | 5 | 6 | 7 | 8 | 9 |
| 9 | 0 | 1 | 2 |  | 4 | 5 | 6 | 7 | 8 | 9 |
| 10 | 0 | 1 | 2 | 3 | 4 | 5 | 6 | 7 | 8 | 9 |

INFORMATION PROCESSING APPARATUS, INFORMATION PROCESSING METHOD, NON-TRANSITORY COMPUTER READABLE MEDIUM, AND LEARNING MODEL

This is a National Stage of International Application No. PCT/JP2021/044857 filed Dec. 7, 2021.

TECHNICAL FIELD

The present invention relates to an information processing apparatus, an information processing method, a program, and a learning model, and more particularly relates to a technique for performing image classification.

BACKGROUND ART

Recent years have seen the active use of electronic commerce (E-commerce), in which products are sold over the Internet, and many EC (Electronic Commerce) websites have been built on the web to carry out such electronic commerce. EC websites are often built using various languages of countries around the world so that users (consumers) in many countries can purchase products. By accessing EC websites from a personal computer (PC) or a mobile terminal such as a smartphone, users can select and purchase desired products without visiting actual stores, regardless of the time of day.

Since a large number of products and many types of products are handled by EC websites, in general, products are managed by being hierarchically classified from coarse (upper-level) classes to fine (lower-level) classes. Such product classification is also utilized in the usage of EC websites. For example, on an EC website, products in classes similar to that of products purchased by the user in the past are displayed as recommended products on the screen viewed by the user in order to increase the user's willingness to purchase. Also, the user can more easily find a desired product by finding out the class of the product in a product image (an image including a product). In view of this, the accurate classification of product images is an important issue for EC websites.

Non-Patent Document Literature 1 discloses a technique for performing hierarchical classification on images using a convolutional neural network model.

LISTING OF REFERENCES

Non-Patent Literature Documents

Non-Patent Literature Document 1: Seo Yian, and Shin Kyung-shik, "Hierarchical convolutional neural networks for fashion image classification", Exp. Sys. Appl., Vol. 116, 2019, 328-329.

SUMMARY OF THE INVENTION

Problems to be Solved by the Invention

Although Non-Patent Literature Document 1 discloses a technique for performing hierarchical classification on objects included in images, there is a problem that as the number of classes in each layer increases and the classification becomes more complex, the accuracy of hierarchical classification may decrease.

The present invention has been made in view of the above problems, and an object of the present invention is to provide a technique for improving the accuracy of hierarchical classification of an object included in an image.

Solution to the Problems

To solve the above-described problem, one aspect of an information processing apparatus according to the present invention includes: an acquiring unit configured to acquire an object image that includes an object; and a predicting unit configured to predict a class of the object by applying the object image acquired by the acquiring unit to a learning model, wherein the learning model includes a main network that extracts a plurality of feature amounts regarding hierarchical classes of the object based on the object image, and a sub network that outputs hierarchical classes of the object based on the plurality of feature amounts, the main network includes a plurality of extractors that extract the plurality of feature amounts, and the sub network includes a plurality of classifiers that output classes of the object based on the plurality of feature amounts, and in the sub network, a higher-level classifier has a connection to one or more lower-level classifiers.

A configuration is possible in which each of the extractors in the main network includes a plurality of convolution layers.

A configuration is possible in which each of the classifiers in the sub network includes a fully-connected neural network.

A configuration is possible in which the hierarchical classes of the object are classes from a coarser class of the object to a finer class of the object.

A configuration is possible in which the information processing apparatus further includes an outputting unit configured to output, as a classification result, the class predicted by the predicting unit.

In the information processing apparatus, a configuration is possible in which in a case where the object image acquired by the acquiring unit includes a plurality of objects, the predicting unit predicts a class of each of the objects by applying an image of the object to the learning model.

To solve the above-described problem, one aspect of an information processing method according to the present invention includes: acquiring an object image that includes an object; and predicting a class of the object by applying the object image acquired in the acquiring to a learning model, wherein the learning model includes a main network that extracts a plurality of feature amounts regarding hierarchical classes of the object based on the object image, and a sub network that outputs hierarchical classes of the object based on the plurality of feature amounts, the main network includes a plurality of extractors that extract the plurality of feature amounts, and the sub network includes a plurality of classifiers that output classes of the object based on the plurality of feature amounts, and in the sub network, a higher-level classifier has a connection to one or more lower-level classifiers.

To solve the above-described problem, one aspect of an information processing program according to the present invention is for causing a computer to execute information processing including: acquiring processing including acquiring an object image that includes an object; and predicting processing including predicting a class of the object by applying the object image acquired by the acquiring processing to a learning model, wherein the learning model includes a main network that extracts a plurality of feature amounts regarding hierarchical classes of the object based on the object image, and a sub network that outputs hierarchical classes of the object based on the plurality of feature amounts, the main network includes a plurality of extractors that extract the plurality of feature amounts, and the sub network includes a plurality of classifiers that output classes of the object based on the plurality of feature amounts, and in the sub network, a higher-level classifier has a connection to one or more lower-level classifiers.

To solve the above-described problem, one aspect of a learning model according to the present invention is a learning model that predicts a class of an object based on an object image that includes the object, the learning model including: a main network configured to extract a plurality of feature amounts regarding hierarchical classes of the object based on the object image; and a sub network configured to output hierarchical classes of the object based on the plurality of feature amounts, wherein the main network includes a plurality of extractors that extract the plurality of feature amounts, and the sub network includes a plurality of classifiers that output classes of the object based on the plurality of feature amounts, and in the sub network, a higher-level classifier has a connection to one or more lower-level classifiers.

Advantageous Effects of the Invention

According to the present invention, it is possible to improve the accuracy of hierarchical classification performed on an image.

A person skilled in the art will be able to understand the above-mentioned objective, aspects, and effects of the present invention, as well as objectives, aspects, and effects of the present invention that are not mentioned above, from the following embodiments for carrying out the invention by referencing the accompanying drawings and the recitations in the scope of claims.

DESCRIPTION OF EMBODIMENTS

Hereinafter, embodiments for carrying out the present invention will be described in detail with reference to the accompanying drawings. Among the constituent elements disclosed below, those having the same function are designated by the same reference numerals, and the descriptions thereof will be omitted. Note that the embodiments disclosed below are examples of means for realizing the present invention, and may be modified or changed as appropriate depending on the configuration of the device to which the present invention is applied and on various conditions, and furthermore, the present invention is not limited to the embodiments below. In addition, not all the combinations of the features described in the embodiments are essential for solutions according to the present invention.

First Embodiment

An information processing apparatus 100 according to a first embodiment acquires an image that includes a product (a product image), and applies the product image to a learning model to predict and output a class for the product image (the product included in the product image). Note that the present embodiment describes an example of predicting hierarchical classes (classes having a hierarchical structure) of a product. Also, the class prediction target is not limited to being a product, and may be any object. Therefore, the present embodiment is also applicable to the case of predicting hierarchical classes of any object from an image that includes the object (an object image).

Functional Configuration of Information Processing Apparatus 100

Figure 1:
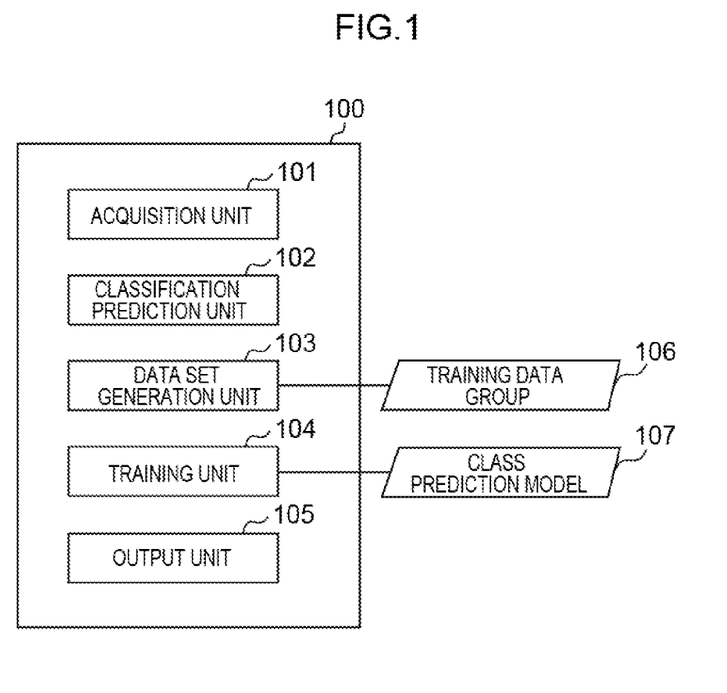
FIG. 1 is a block diagram showing an example of the functional configuration of an information processing apparatus according to an embodiment of the present invention.

FIG. 1 shows an example of the functional configuration of the information processing apparatus 100 according to the present embodiment.

The information processing apparatus 100 shown in FIG. 1 includes an acquisition unit 101, a class prediction unit 102, a data set generation unit 103, a training unit 104, and an output unit 105.

Figure 5:
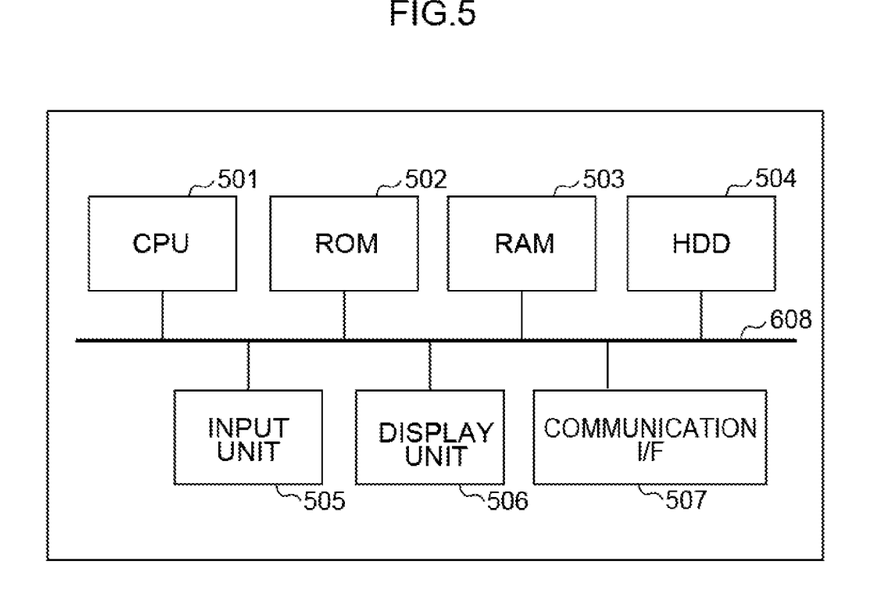
FIG. 5 is a block diagram showing an example of the hardware configuration of the information processing apparatus according to an embodiment of the present invention.

The acquisition unit 101 acquires a product image. The acquisition unit 101 may acquire the product image through an input operation performed by a user (operator) via an input unit 505 (FIG. 5), or from a storage unit (ROM 502 or RAM 503 in FIG. 5) in accordance with a user operation. Also, the acquisition unit 101 may acquire a product image received from an external device via a communication interface (I/F) 507 (FIG. 5). The product image can be an image having colors expressed by the three colors, red (R), green (G), and blue (B). The acquisition unit 101 outputs the acquired product image to the class prediction unit 102.

The class prediction unit 102 applies the product image acquired by the acquisition unit 101 to a class prediction model 107, and predicts classes of a product included in the product image. The class prediction model 107 will be described later.

The data set generation unit 103 generates a training data set for use in training of the class prediction model 107, from a plurality of training data elements (training data) included in a training data group 106. The training data group 106 includes a plurality of pieces of training data, and each piece of training data is constituted by a set of a product image that includes a product and a label (correct data) that indicates the class of the product. The classes may be hierarchical classes. The data set generation unit 103 may use all of the pieces of training data included in the training data group 106 to generate the training data set for use in training, or may use a portion of the pieces of training data to generate the training data set for use in training.

The training unit 104 uses the training data set generated by the data set generation unit 103 to train the class prediction model 107. The class prediction model 107 is a learning model that receives input of a product image that includes a product and predicts classes of the product. The classes may be hierarchical classes.

Figure 2:
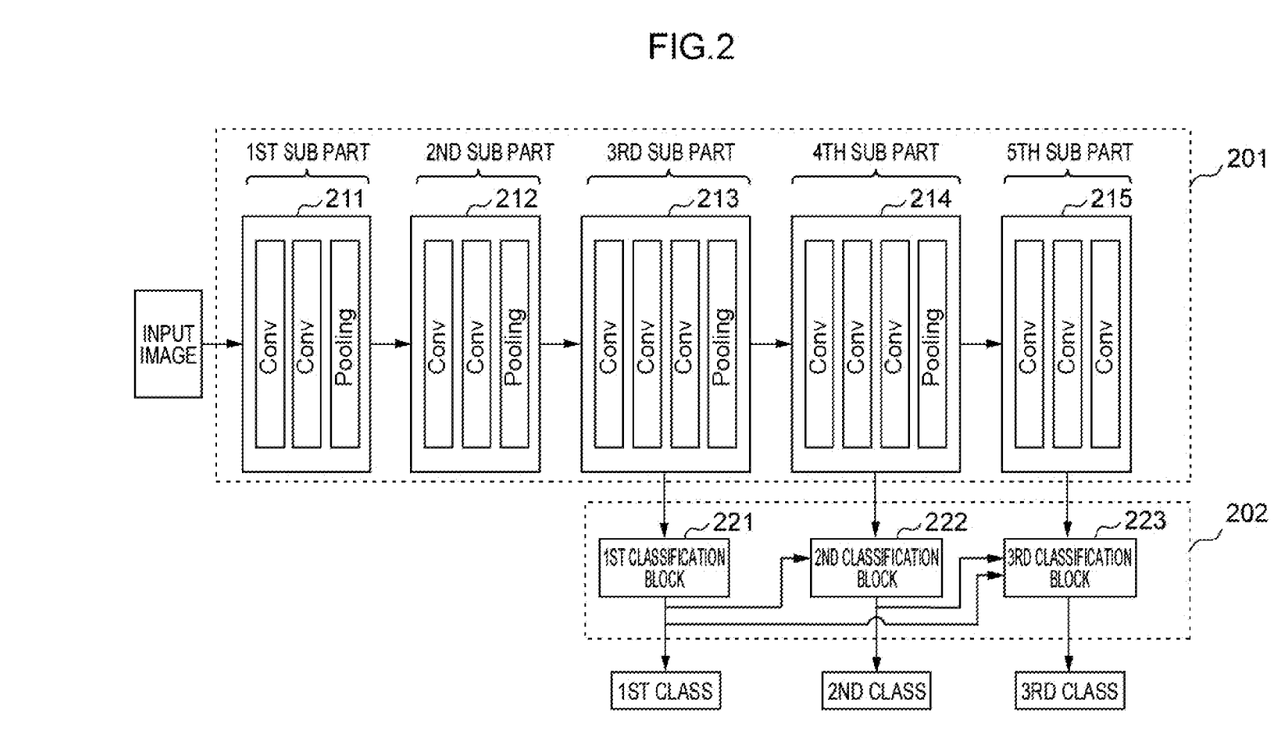
FIG. 2 shows an example of the architecture of a class prediction model.

FIG. 2 shows an example of the architecture of the class prediction model 107. The class prediction model 107 shown in FIG. 2 includes a main network 201 that includes a plurality of sub parts (first to fifth sub parts 211 to 215), and a neural network that includes a sub network 202 that includes a plurality of classification blocks (first to third classification blocks 221 to 223). Note that a sub part can also be referred to as an extractor. Also, a classification block can also be referred to as a classifier.

In the sub network 202 shown in FIG. 2, the output of the first classification block 221 is input to the second classification block 222 and the third classification block 223, and the output of the second classification block 222 is input to the third classification block 223. A skip connection (shortcut connection), which is a configuration in which the output of one block is input to another non-adjacent block in a neural network model, is known in the neural network model ResNet. In ResNet, skip connections are used between feature extraction blocks. On the other hand, the connections between the classifiers in the present embodiment (the first to third classification blocks 211 to 223) are different from known skip connections in that a higher-level classifier is connected to one or more lower-level classifiers. In other words, in the model shown in FIG. 2, the output of a higher-level classifier is input to one or more lower-level classifiers.

The main network 201 shown in FIG. 2 is a neural network based on a 16-layer version of the well-known VGG network (VGGNet), which is a Convolutional Neural Network (CNN) model. In the main network 201, the first sub part 211 and the second sub part 212 each include two convolution layers (Conv) and one pooling layer (Pooling), the third sub part 213 and a fourth sub part 214 each include three convolution layers and one pooling layer, and a fifth sub part 215 includes three convolution layers.

The convolution layers in the first to fifth sub parts 211 to 215 perform convolution with a kernel size of 3×3, but the sub parts have different numbers of filters (numbers of channels). The first sub part 211 has 64 filters, the second sub part 212 has 128 filters, the third sub part 213 has 256 filters, and the fourth sub part 214 and the fifth sub part 215 have 512 filters.

In the pooling layers in the first to fourth sub parts 211 to 214, 2×2 sized max-pooling (MaxPooling) is performed with a stride of two. Also, in the first to fourth sub parts 211 to 214, an ReLU (Rectified Liner Unit) is applied as an activation function between the convolution layers and the pooling layer.

A product image is input as an input image to the main network 201, and the first to fifth sub parts 211 to 215 extract feature amounts of the product image and output the feature amounts as the output of the main network 201. The feature amounts may be feature amounts for hierarchical classification.

In the first to fifth sub parts 211 to 215, product classes are estimated in order from top to bottom. Accordingly, the feature amounts output from the first to fifth sub parts 211 to 215 are in order from higher-level to lower-level, that is to say from feature amounts that indicate higher-level (coarse) classes of the product to feature amounts that indicate lower-level (fine) classes (i.e., feature amounts for hierarchical classification of the product).

The output of the main network 201 is input to the sub network 202. The sub network 202 predicts hierarchical classes from the feature amounts received from main network 201.

The first to third classification blocks 221 to 223 shown in FIG. 2 are each constituted by a fully-connected neural network, receive a feature amount as input, output a label (class) indicating a class of the product in the product image that was input to the main network 201, and determine a class (class name) from the label. The classes (first to third classes) output from the first to third classification blocks 221 to 223 are in order from a higher-level (coarse) class to a lower-level (fine) class of the product. An example of such hierarchical classification will be described later with reference to FIG. 4.

The following is a more specific description of the operations of the first to third classification blocks 221 to 223.

The first classification block 221 outputs a first class label and determines a first class, based on the feature amount output from the third sub part 213 of the main network 201.

The second classification block 222 outputs a second class label and determines a second class, based on the feature amount output from the fourth sub part 214 of the main network 201 and the first class label output from the first classification block 221.

The third classification block 223 outputs a third class label and determines a third class, based on the feature amount output from the fifth sub part 215 of the main network 201, the first class label output from the first classification block 221, and the second class label output from the second classification block 222.

In this way, by complementarily using classification results from a plurality of classifiers, a plurality of lower-level classifiers perform classification based on the classification results output by a higher-level classifier, thus improving the accuracy of hierarchical classification. Note that the present invention is not limited to the configuration shown in FIG. 2, and a configuration is possible in which the classification result of a higher-level classifier is input to one or more lower-level classifiers. For example, the class label output from the first classification block 221 may be input to the third classification block 223 and not input to the second classification block 223.

Note that although an example in which first to third classes are output is shown in the present embodiment, the second classification block 221 and the third classification block 222 apply the feature amounts of higher-level classes, thereby increasing the classification accuracy, and therefore the sub network 202 may be configured to output the second and/or third class, and not output the first class.

Figure 3:
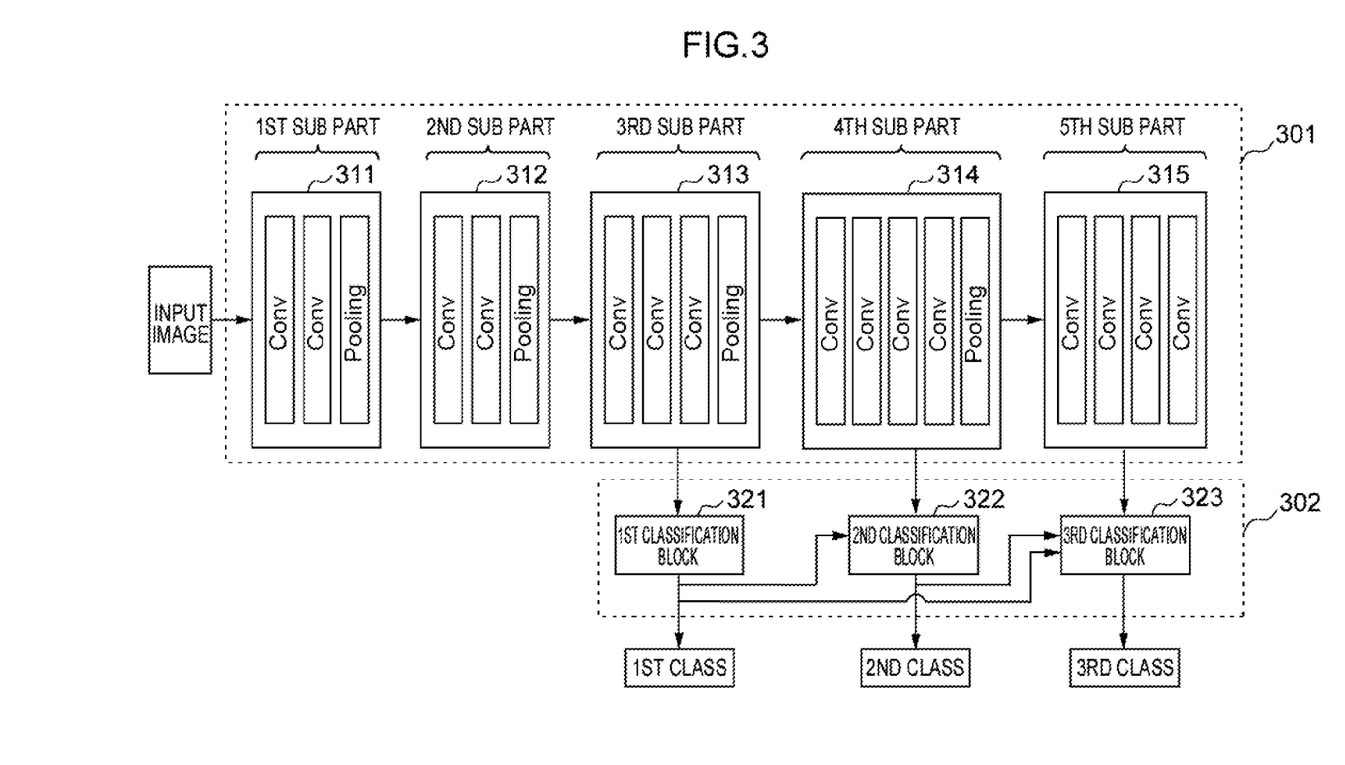
FIG. 3 shows another example of the architecture of a class prediction model.

Also, another example of the architecture of the class prediction model 107 is shown in FIG. 3. The class prediction model 107 shown in FIG. 3 includes a main network 301 that includes a plurality of sub parts (first to fifth sub parts 311 to 315), and a neural network that includes a sub network 302 that includes a plurality of classification blocks (first to third classification blocks 321 to 323). In the sub network 302, the output of the first classification block 321 is input to the second classification block 322 and the third classification block 323, and the output of the second classification block 322 is input to the third classification block 323.

The main network 301 is a neural network based on a 19-layer version of the VGG network. Compared with the model shown in FIG. 2, the first sub part 311 and the second sub part 312 are the same as the first sub part 211 and the second sub part 212, and the third to fifth sub parts 313 to 315 each include one more convolution layer than the third to fifth sub parts 213 to 215. Accordingly, compared with the model shown in FIG. 2, the amount of computation is higher, but deeper learning is performed, which thus may result in more accurate prediction of classes output as a result. The other configurations are similar to those in the model shown in FIG. 2, and thus will not be described.

The training unit 104 uses the training data set generated by the data set generation unit 103 to train the class prediction model 107 configured as shown in FIG. 2 or 3, and stores the trained class prediction model 107 in a storage unit such as the RAM 503 (FIG. 5). Here, as described above, the training data set generated by the data set generation unit 103, that is to say the training data set used for training, may include all of the training data included in the training data group 106, or may include a portion of the training data.

The class prediction unit 102 applies the product image acquired by the acquisition unit 101 to the trained class prediction model 107 stored in the storage unit such as the RAM 503 (FIG. 5), and predicts classes of the product in the product image.

Figure 4:
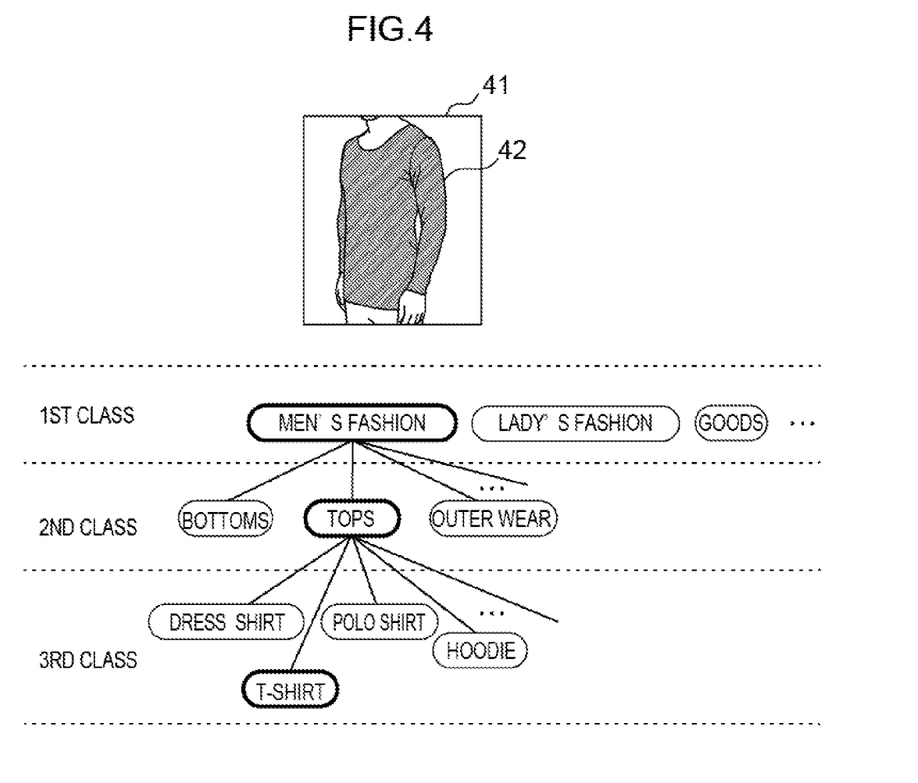
FIG. 4 is a conceptual diagram of hierarchical classification of a product.

FIG. 4 shows a conceptual diagram of hierarchical classification as an example of classes of a product predicted by the class prediction unit 102. FIG. 4 shows an example of hierarchical classification of a product 42 included in a product image 41. By applying the product image 41 to the class prediction model 107, hierarchical first to third classes are estimated as output from the first to third classification blocks 221 to 223 (or from the first to third classification blocks 321 to 323 shown in FIG. 3).

In the example shown in FIG. 4, the classes shown in bold have been predicted for the product 42. In other words, it is predicted that the first class is "men's fashion", the second class is "tops", and the third class is "T-shirt".

In this way, by performing hierarchical learning in the main network 201 (or the main network 301) in the class prediction model 107, it is possible to predict classes from the higher-level (coarse) first class to the lower-level (fine) third class as the classification result.

Hardware Configuration of Information Processing Apparatus 100

FIG. 5 is a block diagram showing an example of the hardware configuration of the information processing apparatus 100 according to the present embodiment.

The information processing apparatus 100 according to the present embodiment can be implemented on one or more computers of any type, one or more mobile devices of any type, or one or more processing platforms of any type.

Although FIG. 5 shows an example in which the information processing apparatus 100 is implemented in a single computer, the information processing apparatus 100 according to the present embodiment may be implemented in a computer system that includes a plurality of computers. The computers may be connected to each other via a wired or wireless network so as to be able to communicate with each other.

As shown in FIG. 5, the information processing apparatus 100 may include a CPU 501, a ROM 502, a RAM 503, an HDD 504, an input unit 505, a display unit 506, a communication I/F 507, and a system bus 508. The information processing apparatus 100 may also be provided with an external memory.

The CPU (Central Processing Unit) 501 performs overall control on the operation of the information processing apparatus 100, and controls various components (502 to 507) via the system bus 508, which is a data transmission path.

The ROM (Read Only Memory) 502 is a non-volatile memory that stores a control program or the like required for the CPU 501 to perform processing. Note that the program may be stored in a non-volatile memory such as an HDD (Hard Disk Drive) 504 or an SSD (Solid State Drive), or an external memory such as a removable storage medium (not shown).

The RAM (Random Access Memory) 503 is a volatile memory and functions as a main memory, a work area, or the like for the CPU 501. That is to say, when performing processing, the CPU 501 loads a required program or the like from the ROM 502 to the RAM 503, and executes the program or the like to realize various functional operations.

The HDD 504 stores, for example, various kinds of data and various kinds of information required for the CPU 501 to perform processing using a program. Also, the HDD 504 stores, for example, various kinds of data and various kinds of information obtained as a result of the CPU 501 performing processing using a program or the like.

The input unit 505 is constituted by a keyboard or a pointing device such as a mouse.

The display unit 506 is constituted by a monitor such as a liquid crystal display (LCD). The display unit 506 may be combined with the input unit 505 to function as a GUI (Graphical User Interface).

The communication I/F 507 is an interface that controls communication between the information processing apparatus 100 and external devices.

The communication I/F 507 provides an interface with the network and communicates with external devices via the network. Various kinds of data, various parameters, and so on are transmitted to external devices and received therefrom via the communication I/F 507. In the present embodiment, the communication I/F 507 may perform communication via a wired LAN (Local Area Network) that conforms to a communication standard such as Ethernet (registered trademark), or a dedicated line. However, the network that can be used in the present embodiment is not limited to these networks, and may be constituted by a wireless network. Examples of this wireless network include a wireless PAN (Personal Area Network) employing Bluetooth (registered trademark), ZigBee (registered trademark), UWB (Ultra Wide Band), or the like. Examples of the wireless network also include a wireless LAN (Local Area Network) employing Wi-Fi (Wireless Fidelity) (registered trademark) or the like, and a wireless MAN (Metropolitan Area Network) employing WiMAX (registered trademark) or the like. Further examples include a wireless WAN (Wide Area Network) employing LTE/3G, 4G, 5G, or the like. The network need only be able to connect devices so as to be able to communicate with each other, and the communication standard, the scale, and the configuration thereof are not limited to the above examples.

At least some of the functions of the constituent elements of the information processing apparatus 100 shown in FIG. 5 can be realized by the CPU 501 executing a program. Also, at least some of the functions of the constituent elements of the information processing apparatus 100 shown in FIG. 5 may be configured to operate as dedicated hardware. In this case, the dedicated hardware operates under the control of the CPU 501.

Processing Flow

Figure 6:
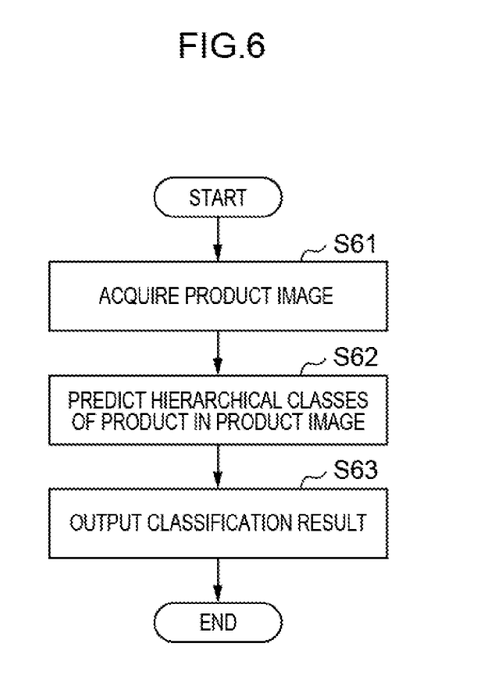
FIG. 6 shows a flowchart of a class prediction phase.

A flow of processing executed by the information processing apparatus 100 according to the present embodiment will be described below with reference to FIG. 6. FIG. 6 shows a flowchart of class prediction processing (a class prediction phase) for a product image (a product included in a product image) performed using the trained class prediction model 107. The processing shown in FIG. 7 can be realized by the CPU 501 of the information processing apparatus 100 loading a program stored in the ROM 502 or the like to the RAM 503 and executing the program.

In step S61, the acquisition unit 101 acquires a product image that includes a product for which classes are to be predicted. For example, when the operator of the information processing apparatus 100 operates the information processing apparatus 100 to access an EC website and select a product image that includes a product, the acquisition unit 101 acquires the product image. Also, the acquisition unit 101 can acquire the product image by acquiring a product image transmitted from an external device such as a user device, or by acquiring a URL indicating the product image. The product image is not limited to including only one product for which classes are to be predicted, and the product image may include a plurality of products for which classes are to be predicted.

In step S62, the class prediction unit 102 inputs the product image acquired by the acquisition unit 101 to the class prediction model 107, and predicts and determines hierarchical classes of the product. As shown in the example in FIGS. 2 and 3, the class prediction model 107 includes a main network that extracts a plurality of feature amounts for hierarchical classification of the product based on the product image, and a sub network that outputs hierarchical classes of the product using the feature amounts. The main network includes a plurality of sub parts (extractors) that extract the feature amounts, the sub network includes a plurality of classification blocks (classifiers) that output classes of the product based on the feature amounts, and higher-level classification blocks have connections to one or more lower-level classification blocks.

In the case of the class prediction model 107 shown in FIG. 2 or 3, as shown in FIG. 4, the class prediction unit 102 predicts and determines a first class, a second class, and a third class (from higher-level to lower-level) as hierarchical classes of the product in the product image acquired in step S61.

In step S63, the output unit 105 outputs the result (classification result) indicating the classes that were predicted and determined by the class prediction unit 102 in step S62. For example, the output unit 105 may display the classification result on the display unit 506 of the information processing apparatus 100, or may transmit the classification result to an external device such as a user device via the communication I/F 507.

Note that in the case where the product image includes a plurality of products, the acquisition unit 101 can acquire a plurality of product regions (regions of interest) that each include one of the products using a known image processing technique, for example, and output the product regions to the class prediction unit 102. Then, the class prediction unit 102 can perform the processing of step S62 for each product region (partial image), and predict and determine classes for each product. The output unit 105 may output separate classification results each indicating the classes (hierarchical classes) of one product, or may output the classes of all of the products as one classification result.

Example of Classification Result

Figure 7:
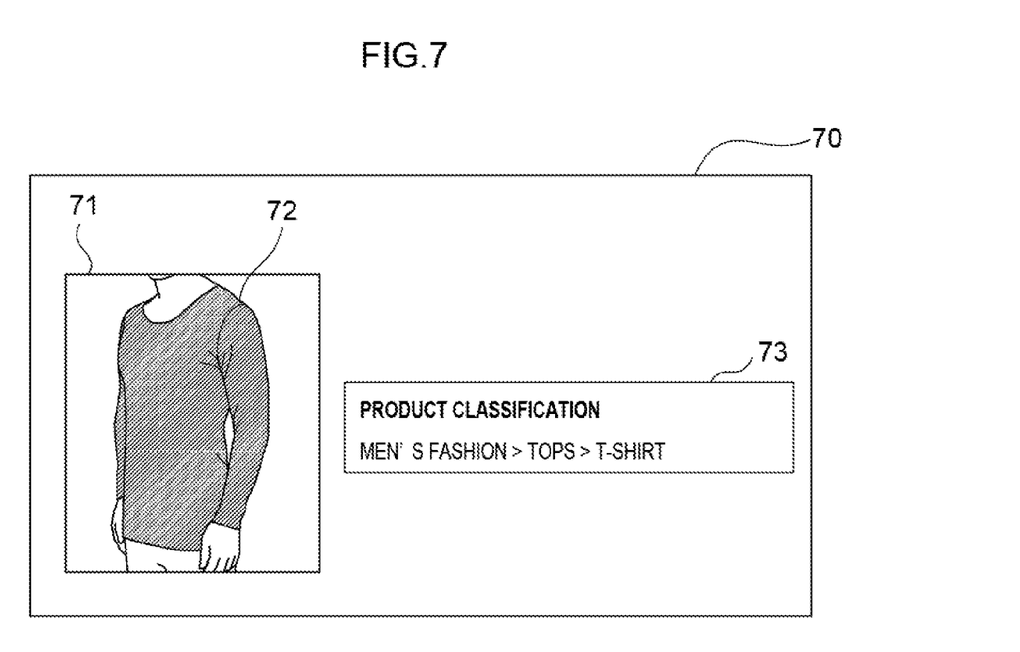
FIG. 7 shows an example of a classification result.

FIG. 7 shows an example of a classification result 70 as an example of a classification result output by the output unit 105. The classification result 70 may be displayed on the display unit 506 of the information processing apparatus 100, or may be transmitted to an external device, such as a user device, via the communication I/F 507 and displayed on the external device.

In the classification result 70, the product image 71 is a product image that includes the product for which classes were predicted, and was selected upon the operator of the information processing apparatus 100 operating the information processing apparatus 100 to access an electronic commerce website. Alternatively, the product image 71 may be an image transmitted from an external device such as a user device.

The class prediction unit 102 of the information processing apparatus 100 applies the product image 71 to the trained class prediction model 107 shown in FIGS. 2 and 3 to predict a hierarchical classification 73 for the product 72. The hierarchical classification 73 is similar to the classification shown in FIG. 4. The output unit 105 can combine the hierarchical classification 73 and the product image 71 to form the classification result 70, and output the classification result 70.

In this way, according to the present embodiment, the product image is applied to the class prediction model 107 to predict hierarchical classes of the product. Here, as shown in FIGS. 2 and 3, the class prediction model 107 has a configuration in which skip connections are applied to the output of the first to third classification blocks 211 to 223 and the output of the first to third classification blocks 311 to 323. According to this configuration, higher-level classification results are combined with lower-level classification results to predict lower-level classes, thus making it possible to accurately predict hierarchical classes of the product.

Second Embodiment

Since trends regarding products handled by EC websites tend to change and become more complex over the medium to long term, it is preferable to construct a model that can handle increasingly complex trends for the classification task as well.

In view of this, the present embodiment describes learning processing for handling increasingly complex classification tasks. Specifically, an embodiment will be described in which the data set generation unit 103 generates a training data set, and the class prediction model 107 is trained using the training data set. Note that descriptions will not be given for configurations and features that are similar to those of the first embodiment.

The data set generation unit 103 according to the present embodiment uses a plurality of training data elements included in the training data group 106 to generate a plurality of training data sets for use in training the class prediction model 107. The training unit 104 successively trains the class prediction model 107 using different training data sets (different sets in a time-series).

In the present embodiment, as one example, the training data group 106 includes training data elements in which ten different correct labels (classes) from "0" to "9" are assigned. Each training data element includes a plurality of data sets each including a product image that includes a product and the same label (correct data) indicating the class of the product. Therefore, the same label is assigned to all of the data sets in each training data element. In the present embodiment, the labels indicate classes having a hierarchical structure, and correspond to the labels assigned for the third class associated with the first class and second class described above, for example. Accordingly, referring to FIG. 4, for example, the label "0" corresponds to "T-shirt" associated with "men's fashion" and "tops", and the training data element with the label "0" includes a plurality of data sets each including an image of a T-shirt and the label "0".

In the present embodiment, the data set generation unit 103 generates a plurality of training data sets by applying predetermined generation rules (selection rules).

The following describes generation rules according to the present embodiment. Note that the following rules are merely examples, and a plurality of training data sets may be generated using other rules or by another method, as long as the number of training data elements successively changes. Also, a plurality of training data sets may be generated such that the training data elements change randomly.

The following are generation rules according to the present embodiment.

Rule 1: An initial training data set is generated by randomly selecting sixty percent (60%) of the training data elements included in the training data group 106. In other words, the initial training data set includes six data elements randomly selected from ten training data elements having the labels "0" to "9".

Rule 2: Starting with the initial training data generated in Rule 1, add and delete training data elements (e.g., perform addition every time, and perform deletion every time). For example, two data elements are added, and one data element is deleted. However, if two more data elements do not exist, only one data element is added.

Rule 3: The training data elements that are added/deleted in Rule 2 are selected randomly. In other words, the training data elements to be added are randomly selected from the training data elements not included in the training data set, and the training data elements to be deleted are randomly selected from the training data elements included in the training data set.

Figure 8:
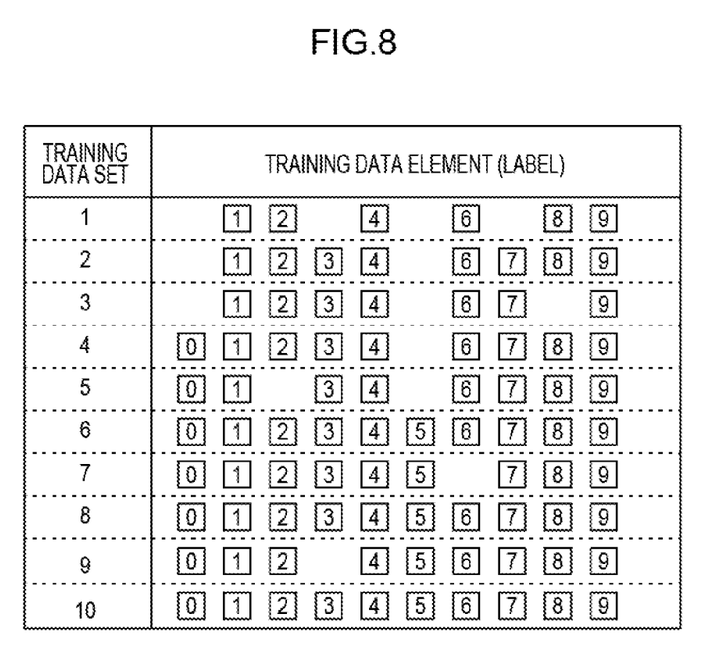
FIG. 8 shows examples of training data sets for the class prediction model.

FIG. 8 shows an example of training data sets generated by the data set generation unit 103 in accordance with the generation rules. The example in FIG. 8 shows ten training data sets 1 to 10. In FIG. 8, the numbers inside squares correspond to training data elements whose labels have the corresponding number.

The training data set 1 is the initial training data set that follows Rule 1, and in the example shown in FIG. 8, was generated using the six training data elements having the labels "1", "2", "4", "6", "8", and "9", which were randomly selected from the ten training data elements.

The training data set 2 is a training data set obtained by randomly selecting the two training data elements having the labels "3" and "7" from among the training data elements that have not be selected (are not included in the training data set 1), and adding the selected training data elements to the training data set 1.

The training data set 3 is a training data set obtained by deleting the one training data element having the label "8" from the training data elements included in the training data set 2.

The training data sets 4 and thereafter are also generated by performing addition and deletion in accordance with the above-described generation rules. In these generation rules, the number of training data elements that are added is greater than the number of training data elements that are deleted, and therefore the maximum number of training data sets is set to 10, and the training data sets 1 to 10 are generated such that the number of training data elements successively increases. In this way, the training data sets 1 to 10 are data sets in which the number of training data elements successively increases/decreases. Note that the data set generation unit 103 may generate the training data set by alternately adding and deleting training data elements. Also, the data set generation unit 103 may generate the training data sets by deleting or adding training data elements after successive additions or deletions of training data elements.

The training data sets 1 to 10 generated in this manner are used (applied) in time-series order to train the class prediction model 107. In other words, the training data set 1 is used at a time t to train the class prediction model 107, and the training data set 2 is subsequently used at a time t+1 to train the class prediction model 107. Such learning processing continues until the training data set 10 is used at a time t+9 to train the class prediction model 107. In the present embodiment, the class prediction model 107 is trained with use of different training data sets in time-series order by such learning processing.

Note that in the present embodiment, an example is described in which the training data sets 1 to 10 generated by the data set generation unit 103 are successively applied to the class prediction model 107, but the processing of the data set generation unit 103 and the training unit 104 may be performed repeatedly. In other words, a configuration is possible in which the data set generation unit 103 generates the training data set 1 and then the training unit 104 uses that data set to train the class prediction model 107, whereafter the data set generation unit 103 generates the training data set 2 and then the training unit 104 uses that data set to train the class prediction model 107, and such processing continues until the training data set 10 is used for training.

Processing Flow

Figure 9:
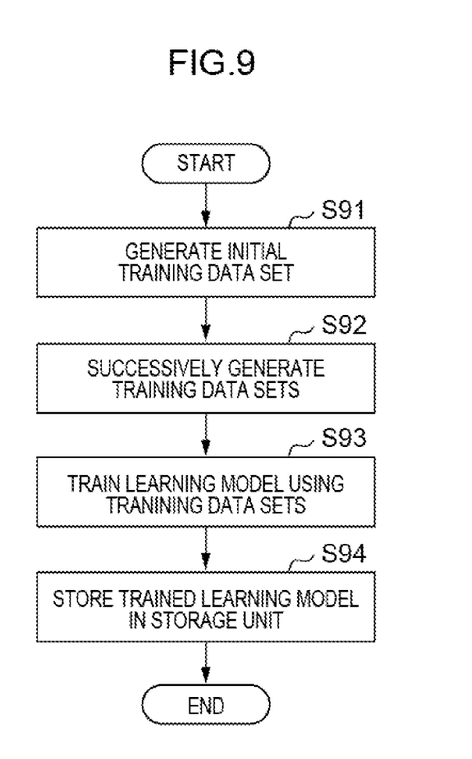
FIG. 9 shows a flowchart of a training phase.

A flow of processing executed by the information processing apparatus 100 according to the present embodiment will be described below with reference to FIG. 9. FIG. 9 shows a flowchart of processing (a training phase) for training the class prediction model 107. The processing shown in FIG. 9 can be realized by the CPU 501 of the information processing apparatus 100 loading a program stored in the ROM 502 or the like to the RAM 503 and executing the program. FIG. 8 will be referenced in the following description given using FIG. 9.

In step S91, the data set generation unit 103 generates the initial training data set (the training data set 1). Subsequently, in step S92, the data set generation unit 103 successively generates the training data sets 2 to 10 by repeatedly performing the addition and deletion of training data elements, starting with the training data set 1.

In step S93, the training unit 104 trains the class prediction model 107 by successively using the training data sets 1 to 10 generated in steps S91 and S92 in time-series order. In other words, the training unit 104 trains the class prediction model 107 by successively using the training data sets 1 to 10 generated such that the number of training data elements successively changes dynamically (randomly). Accordingly, whereas training data sets that have already been used for training are used again at a different time, new training data sets are also used for training.

In step S94, the class prediction model 107 that was trained in S93 is stored in a storage unit (e.g., the RAM 503) as the trained class prediction model 107 by the training unit 104.

Performance Evaluation Results

Table 1 shows results of a simulation for evaluating the performance of class prediction processing. Specifically, Table 1 shows the accuracy rate (Accuracy) for correct data when class prediction processing is performed using various learning models. In this simulation, a Fashion-MNIST data set that can be obtained on the Internet or the like was used as the training data group 106.

TABLE 1

| Learning model | Accuracy | | |
|---|---|---|---|
| | First class | Second class | Third class |
| First comparative model | N/A | N/A | 92.9% |
| Second comparative model | 99.2% | 94.28% | 91.06% |
| Present invention model | 99.72% | 96.52% | 93.36% |

The learning model according to the present embodiment (present invention model) was obtained by training the class prediction model 107 described with reference to FIG. 3 in the first embodiment by successively applying the training data sets 1 to 10 described with reference to FIG. 8.

Also, a first learning model for comparison was obtained as a first comparative model by generating a learning model that includes only the main network 301 and the third classification block 223 of the class prediction model 107 shown in FIG. 3, and training the generated learning model by applying, a single time, the training data set having the labels "0" to "9" as shown in FIG. 8. This learning model can only output the third class.

Furthermore, a second learning model for comparison was obtained as a second comparative model by training the class prediction model 107 described with reference to FIG. 3 in the first embodiment by successively applying six training data sets generated by randomly selecting a plurality of (≤10) pieces of data from the training data group 106.

As can be understood from Table 1, first, for all of the first to third classes, the present invention model has higher accuracy rates than the second comparative model. Also, it can be understood that the present invention model has a higher accuracy rate for the third class than the first comparative model. This is due to the synergistic effect of both using the class prediction model 107 described in the first embodiment and training the class prediction model 107 with use of the training data sets described in the present embodiment in time-series.

As described above, according to the present embodiment, a plurality of training data sets are generated and applied to the class prediction model 107 at different times in a time-series to train the class prediction model 107. The learning model is constructed by such learning processing, thus making it possible to accurately predict increasingly complex classes.

Note that although training data having labels for the third class is used as shown in FIG. 8 in the present embodiment, the present invention is not limited to this. For example, training data having labels for a plurality of hierarchical classes may be used.

As described above, according to the first embodiment of the present invention, it is possible to accurately predict classes of a product from a product image, and furthermore, according to the second embodiment, it is possible to construct a learning model that can handle increasingly complex classification tasks, thus making it possible to improve the ability to predict trends in products purchased on EC websites and the ability for users to easily select products.

Although specific embodiments are described above, the embodiments are merely examples and are not intended to limit the scope of the present invention. The devices and the methods described herein may be embodied in forms other than those described above. Also, appropriate omissions, substitutions, and modifications may be made to the above-described embodiments without departing from the scope of the present invention. Embodiments to which such omissions, substitutions, and modifications are made are included in the range of the invention recited in the scope of claims and equivalents thereof, and belong to the technical scope of the present invention.

REFERENCE NUMERALS AND SYMBOLS

100: Information processing apparatus
101: Acquisition unit
102: Class prediction unit
103: Data set generation unit
104: Training unit
105: Output unit
106: Training data group
107: Class prediction model

The invention claimed is:

1. An information processing apparatus comprising:
a feature extraction model, comprising at least five feature extraction sub networks, configured to output feature amounts associated with an image, wherein:
the first, second, third, and fourth feature extraction sub networks are configured to output to a subsequent sub network of the at least five sub networks;
each of the feature extraction sub networks is configured to extract feature amounts representing one or more classes from an input, and output the extracted feature amounts to one or more subsequent feature extraction sub networks; and
each of the second and subsequent feature extraction sub networks is configured to extract, from the output of a preceding feature extraction sub network, feature amounts representing lower level classes than the preceding feature extraction sub network; and
a classification model, comprising three or more classification sub networks, configured to output one or more classification labels associated with the image, wherein:
the first classification sub network is configured to determine and output a first label based on the feature amount output from the third feature extraction sub network;
the second classification sub network is configured to determine and output a second label based on the first label and based on the feature amount output from the fourth feature extraction sub network; and
the third and subsequent classification sub networks are configured to determine and output third and subsequent labels based on feature amounts output from the fifth and subsequent feature extraction sub networks, and based on based on labels determined by preceding classification sub networks.

2. The information processing apparatus according to claim 1,
wherein each of the feature extraction sub networks include one or more convolution layer.

3. The information processing apparatus according to claim 2,
wherein each of the classification sub networks comprises a fully-connected neural network.

4. The information processing apparatus according to claim 2, wherein the first, second, third, and fourth feature extraction sub networks include pooling layers configured to perform 2×2 sized max-pooling with a stride of two.

5. The information processing apparatus according to claim 4, wherein the convolution layers of the first, second, third, and fourth feature extraction sub networks are connected to the pooling layers by a rectified linear unit.

6. The information processing apparatus according to claim 2, wherein the first and second feature extraction sub networks include two convolution layers, and the third and subsequent feature extraction sub networks include three or more convolution layers.

7. The information processing apparatus according to claim 2, wherein the first and second feature extraction sub networks include two convolution layers, the third feature extraction sub network includes three convolution layers, and the fourth and subsequent feature extraction sub networks include four or more convolution layers.

8. The information processing apparatus according to claim 1, wherein each of the feature extraction sub networks include filters, and wherein the first feature extraction sub network has fewer filters than the second feature extraction sub network, the second feature extraction sub network has fewer filters than the third feature extraction sub network, and the third feature extraction sub network has fewer filters than the fourth feature extraction sub network.

9. The information processing apparatus according to claim 8, wherein the first feature extraction sub network has 64 filters, the second feature extraction sub network has 128 filters, the third feature extraction sub network has 256 filters, and the fourth and subsequent feature extraction sub networks have 512 filters.

10. The information processing apparatus according to claim 1, wherein each of the feature extraction sub networks is configured to extract feature amounts representing one or more classes from an input, and output the extracted feature amounts to two or more subsequent feature extraction sub networks.

11. An information processing method comprising:
determining feature amounts associated with an image using a feature extraction model comprising at least five feature extraction sub networks, wherein the determining comprises:
extracting, by each of the feature extraction sub networks, feature amounts representing one or more classes from an input, and output the extracted feature amounts to one or more subsequent feature extraction sub networks; and
extracting, by each of the second and subsequent feature extraction sub networks, from the output of a preceding feature extraction sub network, feature amounts representing lower level classes than the preceding feature extraction sub network; and
outputting a classification label, using a classification model comprising three or more classification sub networks and configured to output one or more classification labels associated with the image, comprising:
determining, by the first classification sub network, a first label based on the feature amount output from the third feature extraction sub network;
determining, by the second classification sub network, a second label based on the first label and based on the feature amount output from the fourth feature extraction sub network; and
determining, by the third and subsequent classification sub networks, third and subsequent labels based on feature amounts output from the fifth and subsequent feature extraction sub networks, and based on based on labels determined by preceding classification sub networks; and
outputting each of the determined labels.

12. A non-transitory computer readable medium storing a computer program for causing a computer to execute processing comprising:
feature extraction processing including determining feature amounts associated with an image using a feature extraction model comprising at least five feature extraction sub networks, wherein the determining comprises:
extracting, by each of the feature extraction sub networks, feature amounts representing one or more classes from an input, and output the extracted feature amounts to one or more subsequent feature extraction sub networks; and
extracting, by each of the second and subsequent feature extraction sub networks, from the output of a preceding feature extraction sub network, feature amounts representing lower level classes than the preceding feature extraction sub network; and
classification processing including outputting a classification label, using a classification model comprising three or more classification sub networks and configured to output one or more classification labels associated with the image, comprising:
determining, by the first classification sub network, a first label based on the feature amount output from the third feature extraction sub network;
determining, by the second classification sub network, a second label based on the first label and based on the feature amount output from the fourth feature extraction sub network;
determining, by the third and subsequent classification sub networks, third and subsequent labels based on feature amounts output from the fifth and subsequent feature extraction sub networks, and based on based on labels determined by preceding classification sub networks; and
outputting each of the determined labels.

* * * * *